US011878352B2

(12) United States Patent
Kaufmann et al.

(10) Patent No.: US 11,878,352 B2
(45) Date of Patent: Jan. 23, 2024

(54) CUTTING INSERT

(71) Applicant: KENNAMETAL INC., Latrobe, PA (US)

(72) Inventors: Igor Kaufmann, Nuremberg (DE); Sathish Kumar Nagarajan, Tamilnadu (IN); Pradeep Soore, Bangalore (IN)

(73) Assignee: KENNAMETAL INC., Latrobe, PA (US)

( * ) Notice: Subject to any disclaimer, the term of this patent is extended or adjusted under 35 U.S.C. 154(b) by 0 days.

(21) Appl. No.: 17/490,300

(22) Filed: Sep. 30, 2021

(65) Prior Publication Data

US 2022/0097145 A1 Mar. 31, 2022

(30) Foreign Application Priority Data

Sep. 30, 2020 (IN) .............................. 202041042573

(51) Int. Cl.
*B23B 27/14* (2006.01)
*B23B 27/22* (2006.01)
*B23B 27/00* (2006.01)

(52) U.S. Cl.
CPC .......... *B23B 27/143* (2013.01); *B23B 27/145* (2013.01); *B23B 2200/205* (2013.01); *B23B 2200/28* (2013.01); *B23B 2200/32* (2013.01)

(58) Field of Classification Search
CPC ........ B23B 2200/205; B23B 2200/245; B23B 2200/28; B23B 2200/323; B23B 2200/087; B23B 27/143; B23B 27/145; B23C 2200/291; B23C 2200/28; B23C 2200/206; B23C 2200/246; B23C 2200/326
See application file for complete search history.

(56) References Cited

U.S. PATENT DOCUMENTS

| 3,968,550 | A | 7/1976 | Gehri |
| 4,215,957 | A | 8/1980 | Andersson |
| 4,318,645 | A | 3/1982 | McCreery |

(Continued)

FOREIGN PATENT DOCUMENTS

| CN | 106312113 A | 1/2017 |
| DE | 10308234 A1 | 9/2004 |

(Continued)

OTHER PUBLICATIONS

Aug. 12, 2022 Non-Final Office Action U.S. Appl. No. 17/362,069, 12 Pages.

(Continued)

*Primary Examiner* — Sara Addisu

(74) *Attorney, Agent, or Firm* — Christopher J. Owens

(57) ABSTRACT

A cutting insert is described. It has a cutting insert body with a central mounting section and at least one cutting edge. The cutting edge is wave-shaped and generally descending from an end section of the cutting edge towards a middle section of the cutting edge. Furthermore, a chip guiding recess extends substantially along the at least one cutting edge and is arranged between the cutting edge and the central mounting section. A chip breaker element is arranged in the chip guiding recess. The chip breaker element comprises a first portion having a first width and a second portion having a second width, wherein a transition between the first portion and the second portion is formed as a step.

16 Claims, 8 Drawing Sheets

(56) References Cited

U.S. PATENT DOCUMENTS

| | | | |
|---|---|---|---|
| 4,411,565 A | 10/1983 | Hazra et al. | |
| 4,441,841 A | 4/1984 | Mori | |
| 4,685,844 A | 8/1987 | McCreery et al. | |
| 4,969,779 A | 11/1990 | Barten | |
| 5,000,626 A | 3/1991 | Bernadic et al. | |
| 5,006,020 A | 4/1991 | Roos | |
| 5,011,340 A | 4/1991 | Pettersson et al. | |
| 5,044,839 A | 9/1991 | Takahashi | |
| 5,203,649 A | 4/1993 | Katbi et al. | |
| 5,215,415 A | 6/1993 | Fukuoka et al. | |
| 5,221,164 A * | 6/1993 | Allaire | B23C 5/202 407/113 |
| 5,222,843 A | 6/1993 | Katbi | |
| 5,249,894 A | 10/1993 | Bernadic et al. | |
| 5,372,463 A | 12/1994 | Takahashi et al. | |
| 5,437,522 A * | 8/1995 | Satran | B23C 5/2213 407/42 |
| 5,449,255 A | 9/1995 | Katbi et al. | |
| 5,456,557 A | 10/1995 | Bernadic et al. | |
| 5,549,424 A * | 8/1996 | Bernadic | B23B 27/065 407/100 |
| 5,577,867 A | 11/1996 | Paya | |
| 5,688,081 A | 11/1997 | Paya | |
| 5,704,737 A | 1/1998 | Alford | |
| 5,722,803 A * | 3/1998 | Battaglia | B23B 27/146 407/115 |
| 5,743,681 A | 4/1998 | Wiman et al. | |
| 5,758,994 A | 6/1998 | Hintze et al. | |
| 5,772,365 A * | 6/1998 | Vogel | B23C 5/1045 407/42 |
| 5,791,832 A * | 8/1998 | Yamayose | B23C 5/202 407/42 |
| 5,876,154 A * | 3/1999 | Enderle | B23B 27/141 407/115 |
| 5,924,824 A | 7/1999 | Satran et al. | |
| 6,164,878 A | 12/2000 | Satran et al. | |
| 6,186,705 B1 * | 2/2001 | Kumar | B23C 5/109 407/115 |
| 6,234,726 B1 | 5/2001 | Okada et al. | |
| 6,241,430 B1 | 6/2001 | Norstrom | |
| 6,267,541 B1 | 7/2001 | Isakov et al. | |
| 6,447,218 B1 | 9/2002 | Lagerberg | |
| 6,599,061 B1 * | 7/2003 | Nelson | B23B 27/143 407/115 |
| 7,341,408 B2 | 3/2008 | Kratz | |
| 7,438,508 B2 | 10/2008 | Alm et al. | |
| 7,455,483 B2 | 11/2008 | Koskinen | |
| 7,758,287 B2 | 7/2010 | Alm et al. | |
| 8,342,779 B2 | 1/2013 | Kobayashi | |
| 8,585,330 B2 | 11/2013 | Yamazaki et al. | |
| 8,616,810 B2 | 12/2013 | Kaufmann | |
| 8,690,496 B2 | 4/2014 | Komatsuka | |
| 8,702,354 B2 | 4/2014 | Schleinkofer et al. | |
| 8,777,525 B2 | 7/2014 | Löf | |
| 8,814,480 B2 | 8/2014 | Cohen | |
| 8,967,920 B2 | 3/2015 | Krishtul | |
| 9,278,395 B2 * | 3/2016 | Matsuo | B23C 5/109 |
| 9,302,326 B2 | 4/2016 | Hoefermann | |
| 9,409,237 B2 | 8/2016 | Majima et al. | |
| 9,511,422 B2 | 12/2016 | Scherman et al. | |
| 9,586,264 B2 * | 3/2017 | Dufour | B23B 27/141 |
| 10,076,788 B2 | 9/2018 | Krishtul | |
| 10,286,455 B2 | 5/2019 | Tomoda et al. | |
| 10,442,006 B2 | 10/2019 | Inoue | |
| 2002/0159846 A1 * | 10/2002 | Horiike | B23C 5/1045 407/115 |
| 2005/0019111 A1 | 1/2005 | Kitagawa et al. | |
| 2005/0244232 A1 | 11/2005 | Jonsson | |
| 2006/0188347 A1 | 8/2006 | Kratz | |
| 2006/0228179 A1 | 10/2006 | Alm et al. | |
| 2007/0071559 A1 | 3/2007 | Koskinen | |
| 2007/0166545 A1 | 7/2007 | Tanibuchi et al. | |
| 2008/0193231 A1 | 8/2008 | Jonsson et al. | |
| 2008/0219784 A1 | 9/2008 | Yamazaki et al. | |
| 2008/0253848 A1 | 10/2008 | Alm et al. | |
| 2008/0292415 A1 | 11/2008 | Kuroda et al. | |
| 2010/0003089 A1 | 1/2010 | Horiike | |
| 2010/0275749 A1 | 11/2010 | Kobayashi | |
| 2011/0020073 A1 | 1/2011 | Chen et al. | |
| 2011/0033252 A1 | 2/2011 | Nishida | |
| 2011/0070039 A1 | 3/2011 | Park et al. | |
| 2011/0070040 A1 | 3/2011 | Park et al. | |
| 2011/0142555 A1 | 6/2011 | Yamazaki et al. | |
| 2012/0128438 A1 | 5/2012 | Tanaka et al. | |
| 2012/0170987 A1 | 7/2012 | Komatsuka | |
| 2012/0198973 A1 | 8/2012 | Schleinkofer et al. | |
| 2012/0308318 A1 | 12/2012 | Burtscher | |
| 2013/0064613 A1 | 3/2013 | Krishtul | |
| 2013/0094914 A1 | 4/2013 | Majima | |
| 2013/0236258 A1 | 9/2013 | Nada et al. | |
| 2013/0251468 A1 | 9/2013 | Lof | |
| 2013/0272808 A1 | 10/2013 | Cohen | |
| 2014/0286717 A1 | 9/2014 | Lof et al. | |
| 2014/0286718 A1 | 9/2014 | Scherman et al. | |
| 2015/0063926 A1 | 3/2015 | Wu et al. | |
| 2015/0336175 A1 | 11/2015 | Krishtul | |
| 2017/0320143 A1 | 11/2017 | Lof | |
| 2018/0169767 A1 | 6/2018 | Inoue | |
| 2018/0257146 A1 * | 9/2018 | Deguchi | B23C 5/202 |
| 2019/0314901 A1 | 10/2019 | Sakai | |
| 2021/0008637 A1 | 1/2021 | Nagae | |

FOREIGN PATENT DOCUMENTS

| | | | | |
|---|---|---|---|---|
| EP | 2570211 A4 | 7/2014 | | |
| GB | 2093379 A | 9/1982 | | |
| JP | H10118810 A | 5/1998 | | |
| JP | 5260924 B2 | 8/2013 | | |
| WO | WO-9939853 A1 * | 8/1999 | | B23B 27/10 |
| WO | WO2009005218 A1 | 1/2009 | | |
| WO | WO2013038405 A1 | 3/2013 | | |
| WO | WO2018042957 A1 | 3/2018 | | |
| WO | 2019189406 A1 | 10/2019 | | |

OTHER PUBLICATIONS

Apr. 20, 2023 Advisory Action Received U.S. Appl. No. 17/362,069, 2 Pages.

May 4, 2023 Foreign Office Action Chinese Application No. CN202110690566.1, 2 Pages.

May 24, 2023 Non-Final Office Action U.S. Appl. No. 17/362,069, 13 Pages.

Feb. 9, 2023 Final Office Action U.S. Appl. No. 17/362,069, 14 Pages.

Aug. 2, 2023 Foreign Office Action Chinese Application No. CN20211179274, 2 Pages.

* cited by examiner

CUTTING INSERT

RELATED APPLICATION DATA

The present application claims priority pursuant to 35 U.S.C. § 119(a) to Indian Patent Application Number 202041042573 filed Sep. 30, 2020 which is incorporated herein by reference in its entirety.

FIELD

The invention relates to a cutting insert having a cutting insert body with a central mounting section and at least one cutting edge. Moreover, it has a chip guiding recess extending substantially along the at least one cutting edge, wherein the chip guiding recess is arranged between the cutting edge and the central mounting section. A chip breaker element is arranged in the chip guiding recess.

BACKGROUND

Such cutting inserts are known in the art. They are preferably used in combination with turning tools, but may also be used in combination with milling tools or drilling tools.

Furthermore, such cutting inserts are mainly used for finishing operations.

The general objective of a finishing operation is to generate a smooth surface on a work piece. To this end effective chip evacuation is necessary.

A further objective in connection with finishing tools and corresponding cutting inserts is that the finishing tools and cutting inserts are suitable for being used in connection with different kinds of material and/or cutting processes using different cutting parameters. In other words, the cutting tools and cutting inserts shall be universally usable.

The objective of the present invention is consequently to provide an improved cutting insert. The cutting insert shall be of high universality, i.e. the cutting insert shall be usable in combination with different materials and cutting processes of different parameters. Of course, the cutting insert shall be able to generate a smooth surface on a work piece.

SUMMARY

The problem is solved by a cutting insert having a cutting insert body with a central mounting section and at least one cutting edge. The cutting edge is wave-shaped and generally descends from an end section of the cutting edge towards a middle section of the cutting edge. Additionally, a chip guiding recess extends substantially along the at least one cutting edge and is arranged between the cutting edge and the central mounting section. A chip breaker element is arranged in the chip guiding recess, wherein the chip breaker element comprises a first portion having a first width and a second portion having a second width, wherein a transition between the first portion and the second portion is formed as a step. The wave-shaped cutting edge has the effect that chips break in a reliable manner. Consequently, the chips may be evacuated in an effective manner. This is especially true if high cutting depths are realized with the cutting insert. In this context, the end section of the cutting edge is especially arranged at a corner of the cutting insert. Consequently, a middle section of the cutting edge is preferably arranged in between two end sections. The arrangement of the cutting edge in a generally descending manner further facilitates chip breaking and chip evacuation, especially when high cutting depths are realized. A width of the portions of the chip breaker element is preferably measured in a plane being parallel to a top surface of the central mounting section. Preferably, the first portion and the second portion are arranged one on top of the other, wherein the portion having the greater width is a lower portion. According to a variant, the portions of the chip breaker element are substantially circular. Thus, the width may also be designated a diameter. The chip breaker element additionally leads to reliable breaking and evacuation of the chips. Since the chip breaker element comprises two portions, the chip breaking and the chip evacuation are substantially independent of the material of a work piece which is cut and its chip forming properties. Furthermore, the two portions lead to a certain independence of a cutting speed and applied cutting forces. Thus, the cutting insert provides a high universality in respect of its use. The improved chip breaking and chip evacuation characteristics lead to an increased surface quality of the processed work piece.

A cutting insert according to the invention is preferably mounted on a tool holder. A tool being formed by the cutting insert and the tool holder is preferably a turning tool.

The cutting edge of the cutting insert may be equipped with a protective chamfer extending over the entire length of the cutting edge or only in the middle section thereof. Such a chamfer leads to an increased stability of the cutting edge. Consequently, the service life of the cutting insert is increased.

In a variant of the cutting insert, further chip breaker elements may be arranged within the chip guiding recess. The further chip breaker element may be distributed along the general extension of the cutting edge. In a preferred example, the further chip breaker elements merge into the geometry of the wave-shaped cutting edge. This means that for example chip breaker elements are arranged adjacent to sections of the cutting edge forming a wave peak. Such a configuration is very stable and thus leads to an increased service life of the cutting insert.

According to an embodiment, the non-linear cutting edge comprises a plurality of linear cutting edge segments being provided at different heights with respect to a top surface of the central mounting section. Such a cutting tool offers a high cutting performance in combination with a long service life. In combination with the generally descending arrangement of the cutting edge, each linear cutting edge segment forming a wave peak is at the same height or lower than its neighbor on a side being directed towards an end section of the cutting edge. Among all linear cutting edge segments, at least one cutting edge segment is lowered with respect to its neighbor on the side facing the corresponding end section.

Preferably, neighboring linear cutting edge segments are connected by non-linear connecting segments, wherein the non-linear connecting segments tangentially merge into the neighboring linear cutting edge segments. Consequently, the cutting edge develops smoothly over its entire extension. As a consequence thereof, load peaks on the cutting edge are avoided and the cutting edge has a long service life. The non-linear connecting segments may have a sinusoidal form, i.e. they may be formed as segments of a sinusoidal curve.

The step may comprise a substantially flat surface. The surface is especially arranged in parallel to a top surface of the central mounting section. The cutting insert is thus easy to manufacture. At the same time a chip breaker element having a step with such a surface leads to reliable breaking and evacuation of the chips.

Also, the chip breaker element may comprise a top surface being substantially parallel to a top surface of the central mounting section. The top surface of the chip breaker element may be flat. The cutting insert, thus, is simple in structure and manufacturing.

Alternatively, the chip breaker element comprises a top surface being inclined towards the central mounting section. This means that a normal on the top surface is tilted in the direction of the central mounting section. Preferably, the top surface is flat. Such a configuration leads to increased chip evacuation abilities.

In a further alternative the top surface of the chip breaker element is domed or convex. It may comprise a portion of a sphere. A normal on the top surface may be substantially vertical or inclined. Also such a surface leads to good chip evacuation properties.

According to a variant the chip breaker element merges with the central mounting section. Put otherwise, the chip breaker element is formed as an appendix to the central mounting section which extends into the chip guiding recess. An advantage of such a configuration is that the cutting insert may be compact in size.

Alternatively, the chip breaker element is separated from the central mounting section by a gap. Consequently, the chip breaker element may be positioned within the chip guiding recess in a substantially independent manner. The position of the chip breaker element is especially independent from the central mounting section.

A rake angle may vary over the length of the cutting edge. Especially, the rake angle is bigger in the end section of the cutting edge than in the middle section. The rake angle may additionally or alternatively vary in function of the wave-shape of the cutting edge, i.e. the rake angle may vary between a wave peak of the wave-shape and a wave base of the wave-shape. For example, the rake angle may increase starting from a wave peak until it reaches the lowest point of a neighboring wave base. From there, i.e. starting from the lowest point of the wave base, the rake angle may decrease until it reaches a further wave peak. Preferably, the rake angle is always positive. Consequently, the cutting edge is stable and suitable for high performance cutting operations.

The cutting insert may also comprise a coolant channel being arranged adjacent to the chip guiding recess or within the chip guiding recess. Preferably, the coolant channel generally extends towards the chip breaker element. Consequently, coolant may be supplied to the chip breaker element and to a corresponding cutting zone in a precise and efficient manner.

According to a preferred embodiment the cutting insert comprises an additional cutting edge, wherein the cutting edge and the additional cutting edge form neighboring edges of a polygon and intersect in a corner portion of the cutting insert. In this context, the corner may be rounded. The polygon may be a tetragon, a hexagon or an octagon. Such cutting inserts are suitable for being used in standard cutting tools.

The chip breaker element is preferably arranged in the corner portion. More preferably, the chip breaker element is arranged on an angle bisector of the cutting edge and the additional cutting edge. Consequently, the chip breaker element may interact in a substantially equal manner with chips being cut by both cutting edges. In other words, the chip breaker element is assigned to both cutting edges.

The cutting edge may be rounded with a rounding radius, wherein a rounding radius at a wave peak of the wave-shaped cutting edge is bigger than a rounding radius at a wave base of the wave-shaped cutting edge. Such a cutting edge is very stable and leads to an increased service life of the corresponding cutting insert.

Advantageously, the cutting insert is an indexable cutting insert. Thus, the cutting insert may be used in a corresponding cutting tool in different orientations. This is an efficient manner of using cutting inserts.

BRIEF DESCRIPTION OF THE DRAWINGS

The invention will now be explained with reference to different embodiments which are shown in the attached drawings. In the drawings.

DETAILED DESCRIPTION

Figure 1:
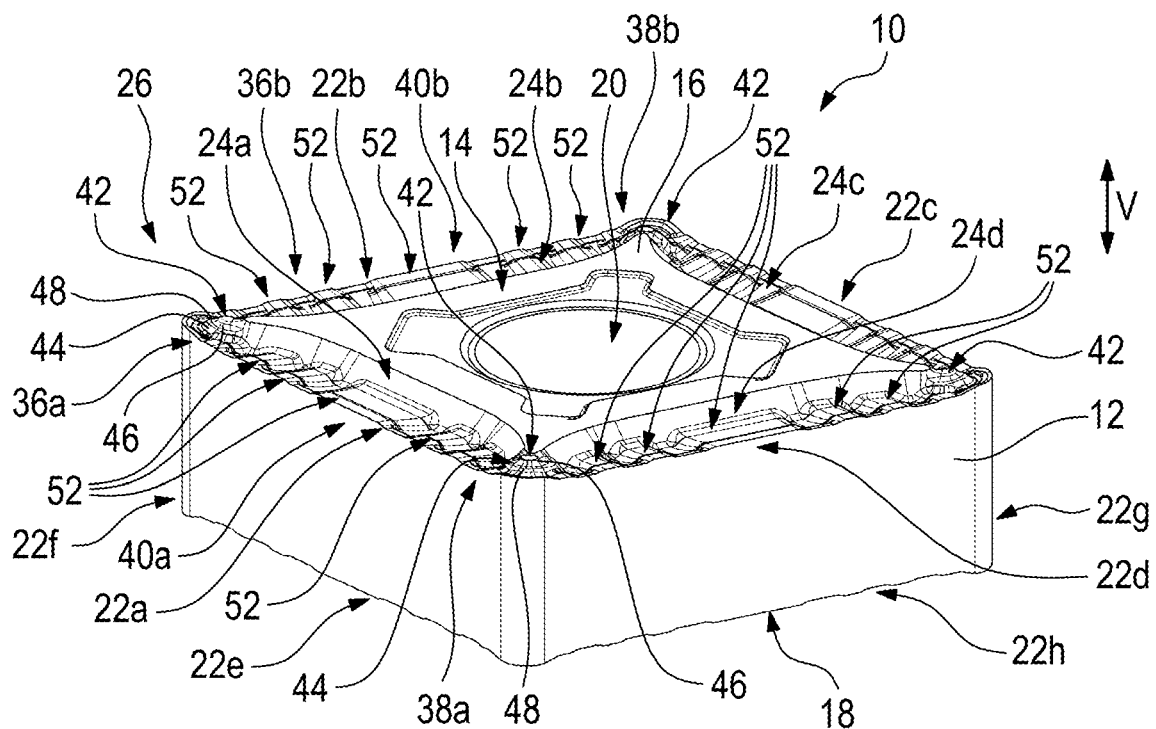
FIG. 1 shows a cutting insert according to a first embodiment of the invention in a perspective view.
Figure 2:
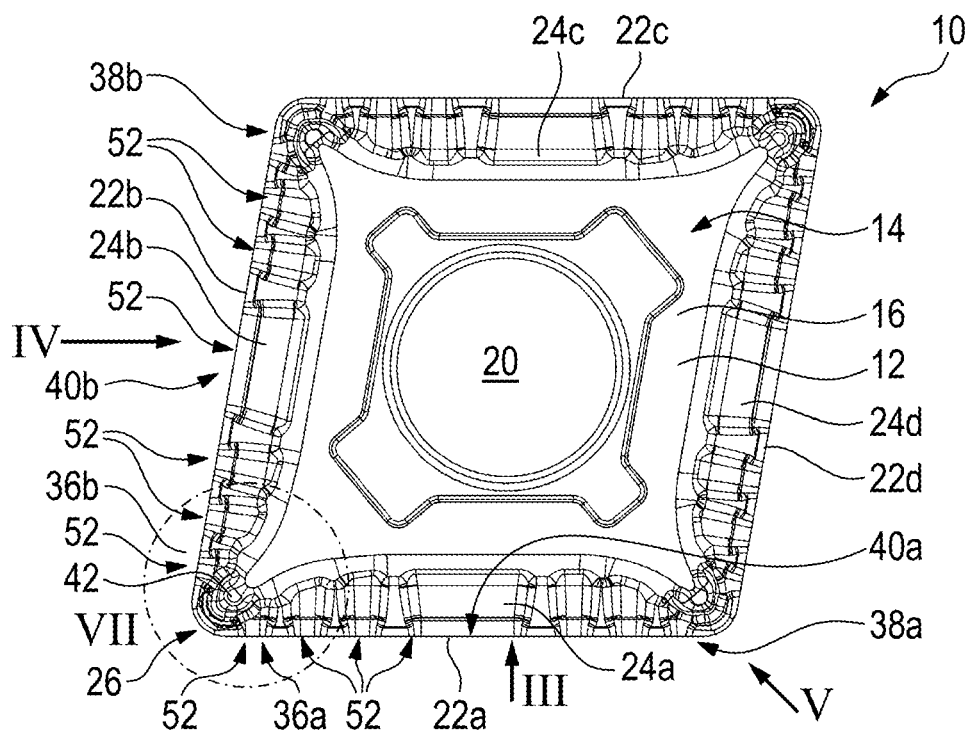
FIG. 2 shows the cutting insert of FIG. 1 in a top view which also corresponds to a bottom view of the cutting insert of FIG. 1.
Figure 3:
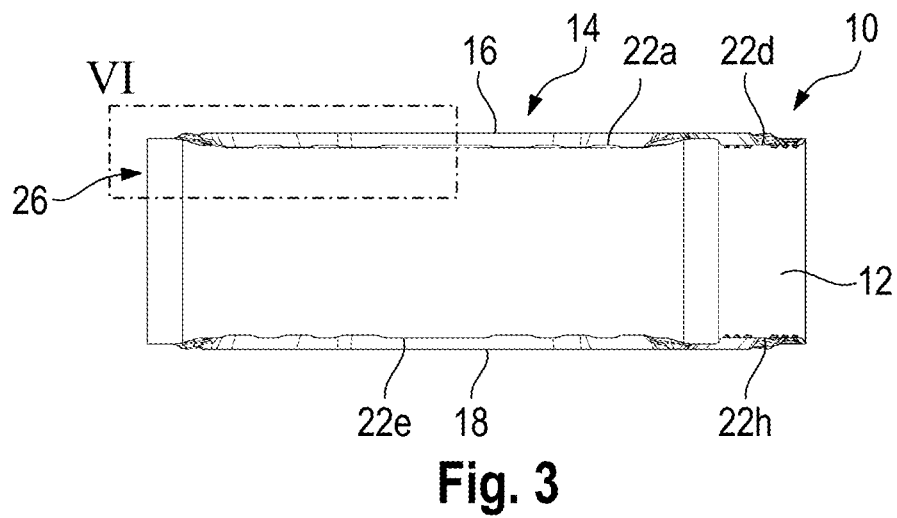
FIG. 3 shows the cutting insert of FIG. 2 in a side view along direction III.
Figure 4:
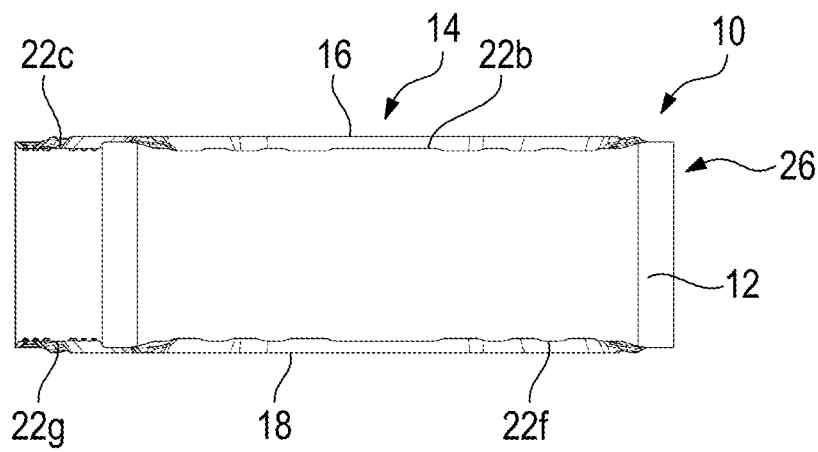
FIG. 4 shows the cutting insert of FIG. 2 in a side view along direction IV.
Figure 5:
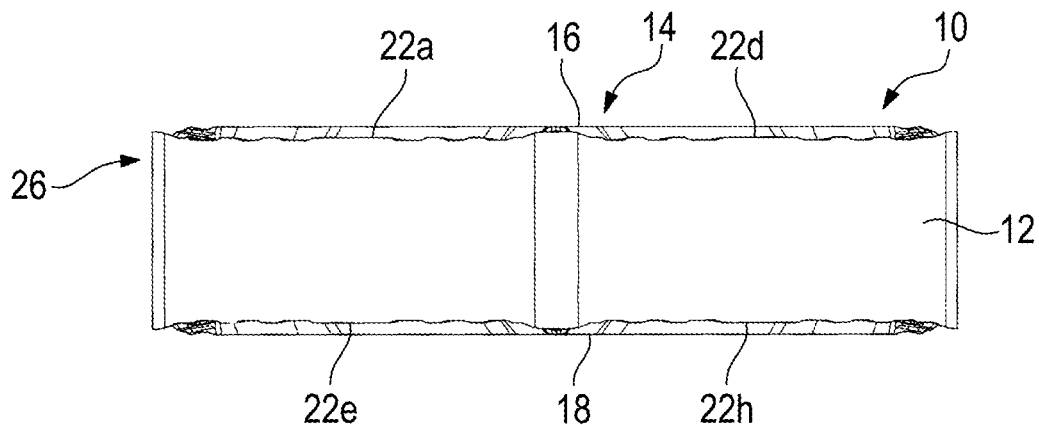
FIG. 5 shows the cutting insert of FIG. 2 in a side view along direction V.

FIG. 1 shows a cutting insert 10 which is formed as a tetragonal indexable cutting insert.

The cutting insert 10 has a cutting insert body 12 with a central mounting section 14.

The central mounting section 14 comprises a top surface 16 and a bottom surface 18 which are substantially parallel to each other. In the middle of the central mounting section 14 a mounting hole 20 is provided which connects the top surface 16 and the bottom surface 18.

The cutting insert 10 may be mounted on a known tool holder in a generally known manner using the mounting hole 20. A mounting screw or a clamp may be inserted into the mounting hole 20 to this end.

Since the cutting insert 10 has a tetragonal shape and is two-sided, it comprises a total of eight cutting edges 22a to 22h.

Each cutting edge 22a to 22h substantially extends along and edge of the cutting insert body 12.

Moreover, each of the cutting edges 22a to 22h is associated with a chip guiding recess 24a to 24h extending substantially along the corresponding cutting edge 22a to 22h.

Each of the chip guiding recesses 24a to 24h is arranged between the corresponding cutting edge 22a to 22h and the central mounting section 14.

In the following, for the ease of explanation, the structure of the cutting edges 22a to 22h will be explained with reference to cutting edges 22a and 22b only. These cutting edges 22a, 22b are exemplary for the remaining cutting edges.

The cutting edges 22a, 22b form neighboring edges of the cutting insert 10 and intersect in a corner portion 26 thereof which is rounded.

Both cutting edges 22a, 22b are wave-shaped.

Accordingly, they comprise wave peaks generally designated by reference sign 28 and wave bases generally designated by reference sign 30.

In more detail, the cutting edges 22a, 22b comprises a plurality of linear cutting edge segments 32, which may form a wave peak 28 or a wave base 30.

Figure 6:
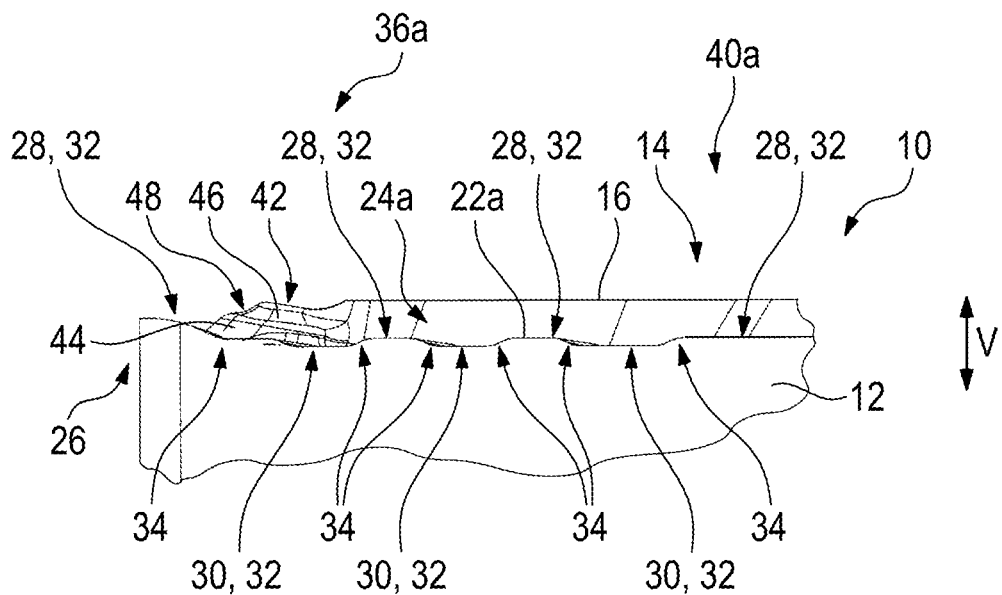
FIG. 6 shows a detail VI of the cutting insert of FIG. 3.

Neighboring linear cutting edge segments 32 are connected by non-linear connecting segments 34. The non-linear connecting segments 34 tangentially merge into the neighboring linear cutting edge segments 32 (cf. FIG. 6).

Consequently, the cutting edges 22a, 22b are smooth, i.e. do not comprise sharp edges along their general extension.

It comes naturally, that the linear segments 32 of the cutting edges 22a, 22b are provided at different heights with respect to the top surface 16 of the central mounting section 14, i.e. a distance between the top surface 16 and the linear segments 32 being measures substantially along a vertical direction V varies between the linear segments 32.

Each of the cutting edges 22a, 22b comprises an end section 36a, 36b forming the corner portion 26. At their respective opposing ends the cutting edges 22a, 22b comprise a further end section 38a, 38b.

Between the respective end sections 36a, 36b, 38a, 38b the cutting edges 22a, 22b each comprises a middle section 40a, 40b.

The cutting edges 22a, 22b are generally designed such that they descend from the respective end sections 36a, 36b, 38a, 38b towards the corresponding middle section 40a, 40b. This means that a distance between a portion of one of the cutting edges 22a, 22b being located in the respective end section 36a, 36b, 38a, 38b and the top surface 16 of the central mounting section 14 is smaller than a distance between a portion of one of the cutting edges 22a, 22b being located in the respective middle section 40a, 40b and the top surface 16 of the central mounting section 14.

The distance is always measured along the vertical direction V.

A rake angle γ of the cutting edges 22a, 22b varies over the length of the cutting edges 22a, 22b. In the example shown the rake angle γ is always positive (cf. FIGS. 8 to 12).

Two variation trends are overlapping each other. First, the rake angle γ is generally bigger in the end sections 36a, 36b, 38a, 38b of the corresponding cutting edge 22a, 22b than in the corresponding middle sections 40a, 40b.

Second, the rake angle γ varies along the wave-shape of the cutting edges 22a, 22b. In this context, the rake angle γ is generally bigger in the wave peaks 28 than in the corresponding wave bases 30.

Moreover, the cutting edges are rounded with a rounding radius R.

The rounding radius R is bigger at a wave peak 28 of the wave-shaped cutting edges 22a, 22b than the rounding radius R at a wave base 30 of the wave-shaped cutting edge 22a, 22b.

In order to facilitate chip breaking and chip evacuation a chip breaker element 42 is arranged in the chip guiding recesses 24a, 24b.

The chip breaker element 42 is arranged in the corner portion 26.

Figure 7:
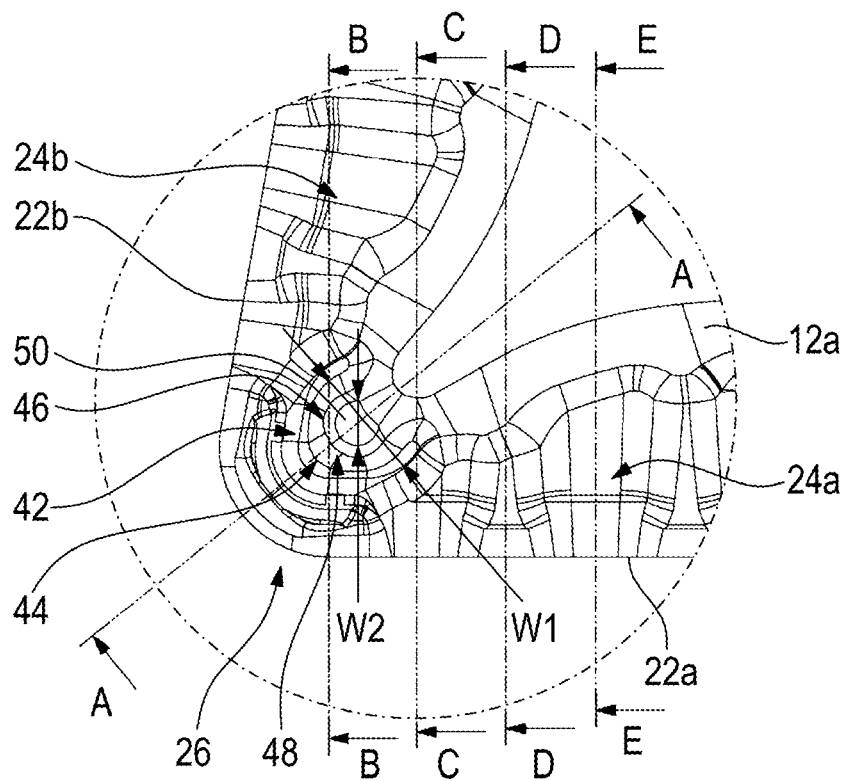
FIG. 7 shows a detail VII of the cutting insert of FIG. 2.
Figure 8:
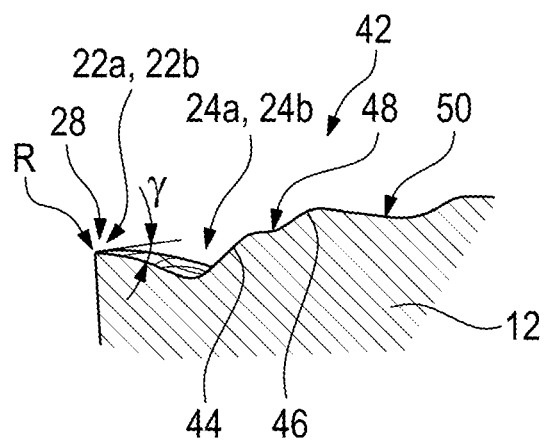
FIG. 8 shows a sectional view of the cutting insert of FIGS. 1 to 7 along a plane A-A in FIG. 7.
Figure 9:
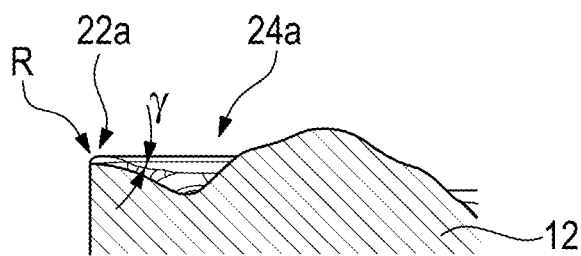
FIG. 9 shows a sectional view of the cutting insert of FIGS. 1 to 7 along a plane B-B in FIG. 7.
Figure 10:
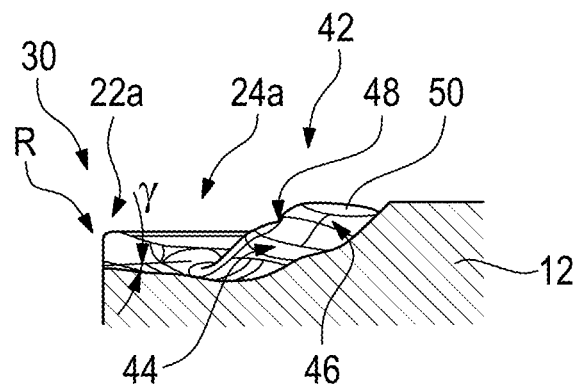
FIG. 10 shows a sectional view of the cutting insert of FIGS. 1 to 7 along a plane C-C in FIG. 7.
Figure 11:
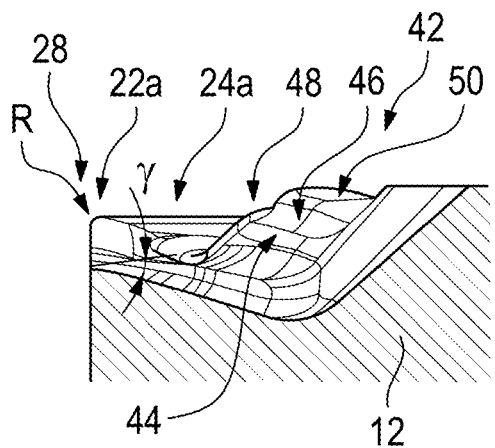
FIG. 11 shows a sectional view of the cutting insert of FIGS. 1 to 7 along a plane D-D in FIG. 7.
Figure 12:
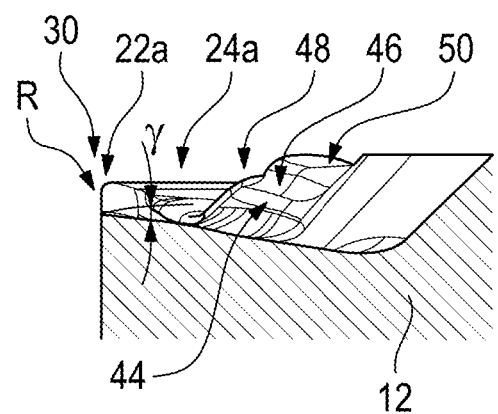
FIG. 12 shows a sectional view of the cutting insert of FIGS. 1 to 7 along a plane E-E in FIG. 7.

More precisely, the chip breaker element 42 is arranged on an angle bisector of the cutting edges 22a, 22b (cf. FIG. 7).

Consequently, the chip breaker element 42 is suitable for breaking chips resulting from a cutting operation using cutting edge 22a and cutting edge 22b.

In other words, the chip breaker element 42 is attributed to cutting edge 22a and cutting edge 22b.

Since the chip breaker element is arranged close to the cutting edges 22a, 22b it is particularly useful for finishing operations.

The chip breaker element 42 comprises a first portion 44 having a first width W1.

In the example shown the first portion 44 is a lower portion of the chip breaker element 42.

Additionally, the chip breaker element 42 comprises a second portion 46 having a second width W2.

The second portion 46 is an upper portion of the chip breaker element 42 and is arranged on top of the first portion 44.

The first width W1 is bigger than the second width W2.

A transition between the first portion 44 and the second portion 46 is thus formed as a step 48.

The second portion 46 is limited by a top surface 50 of the chip breaker element 42. The top surface 50 is inclined towards the central mounting section 14 (cf. FIG. 6).

In the example shown in FIGS. 1 to 12, the chip breaker element 42 is arranged such that it merges with the central mounting section 14.

Additional chip breaker elements 52 are arranged along the cutting edges 22a, 22b.

These chip breaker elements 52 are substantially arranged adjacent to the wave peaks 28 of the wave-shaped cutting edges 22a, 22b.

They are formed such that they merge with the wave-shape of the cutting edges 22a, 22b. This means that an outer contour of the chip breaker elements 52 at least partially and at least substantially follows a section of the corresponding cutting edge 22a, 22b when seen in a side view.

Figure 13:
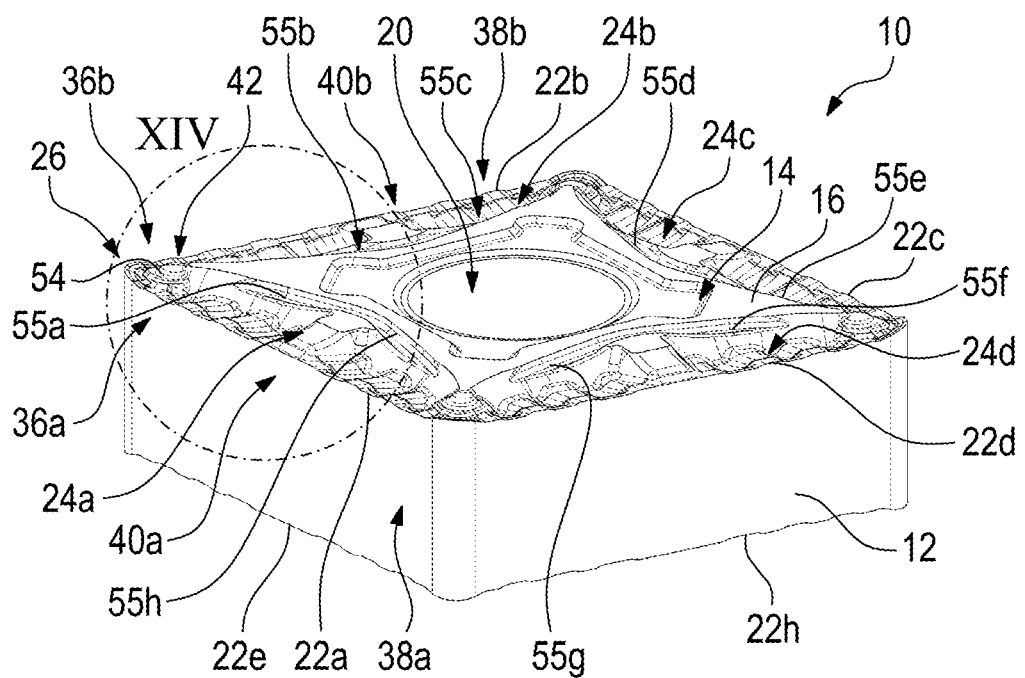
FIG. 13 shows a cutting insert according to a second embodiment of the invention in a perspective view.
Figure 14:
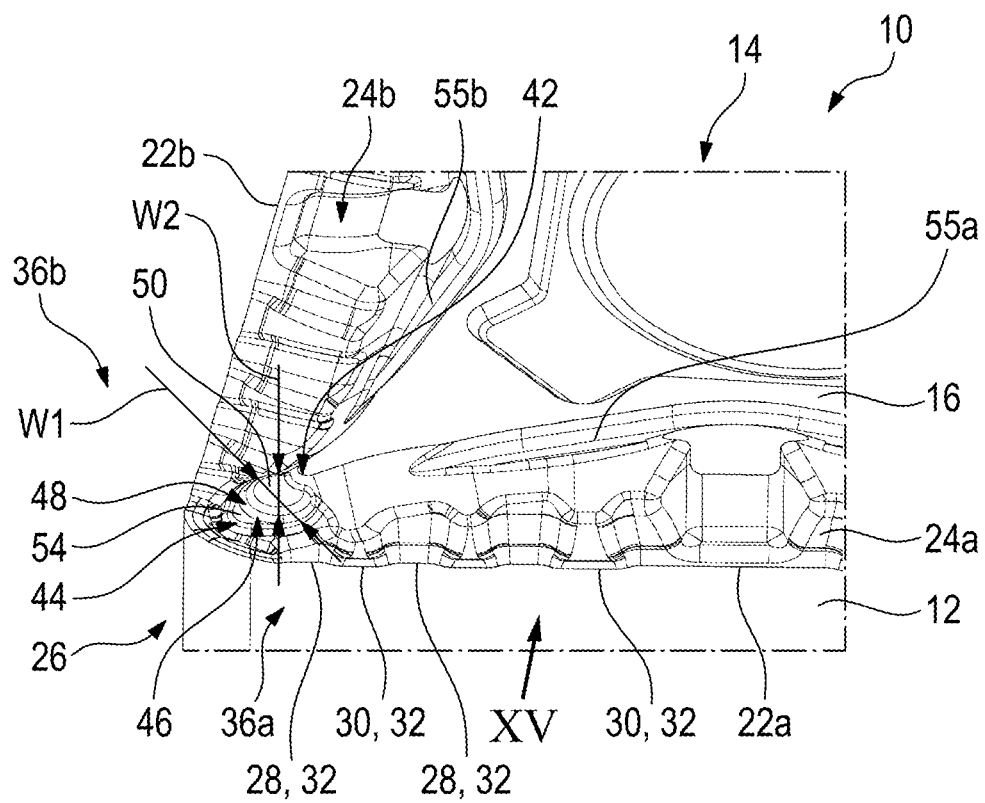
FIG. 14 shows a detail XIV of the cutting insert of FIG. 13.
Figure 15:
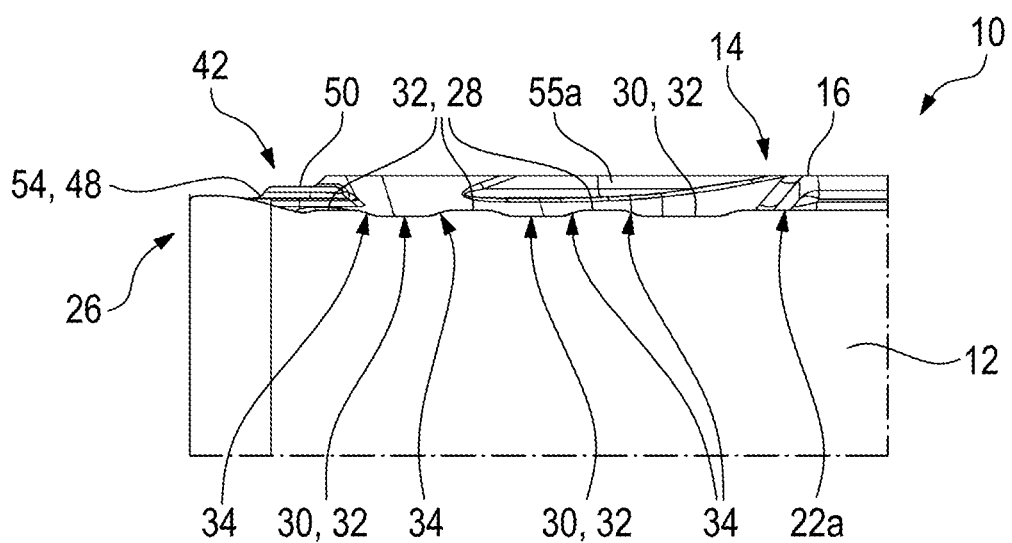
FIG. 15 shows the detail of FIG. 14 in a corresponding side view along direction XV in FIG. 14.

A cutting insert 10 according to a second embodiment is shown in FIGS. 13 to 15. In the following, only the differences with respect to the cutting insert 10 according to the first embodiment will be explained. Same or corresponding elements thereof will be designated with the same reference signs.

The differences relate to the chip breaker element 42.

In the second embodiment a top surface 50 thereof is flat and substantially parallel to the top surface 16 of the central mounting section 14.

Moreover, the step 48 comprises a substantially flat surface 54.

In addition, the substantially flat surface 54 is arranged in parallel to the top surface 16 of the central mounting section 14.

Moreover, the cutting insert 10 according to the second embodiment comprises several coolant channels 55a to 55h.

All coolant channels 55a to 55h are arranged within a corresponding chip guiding recess 24a to 24d.

In more detail, coolant channels 55a and 55h are arranged within a wall section of the chip guiding recess 24a, coolant channels 55b and 55c are arranged within a wall section of the chip guiding recess 24b, coolant channels 55d and 55e are arranged within a wall section of the chip guiding recess 24c and coolant channels 55f and 55g are arranged within a wall section of the chip guiding recess 24d.

All coolant channels 55a to 55h are generally groove shaped, i.e. a top side of each of the coolant channels 55a to 55h is open.

Furthermore, the coolant channels 55a to 55h are arranged such that a general extension thereof points towards a corresponding chip breaker element 42.

In the second embodiment, two coolant channels point to each of the chip breaker elements 42, e.g. coolant channels 55a and 55b point to chip breaker element 42.

As far as the remaining features of the cutting insert 10 according to the second embodiment are concerned, reference is made to the explanations in respect of the first embodiment.

It is additionally understood, that the coolant channels 55a to 55h, which have only been explained in connection with the second embodiment, may also be used in a cutting insert 10 according to the first embodiment or a cutting insert 10 according to a third embodiment which will be explained below.

Figure 16:
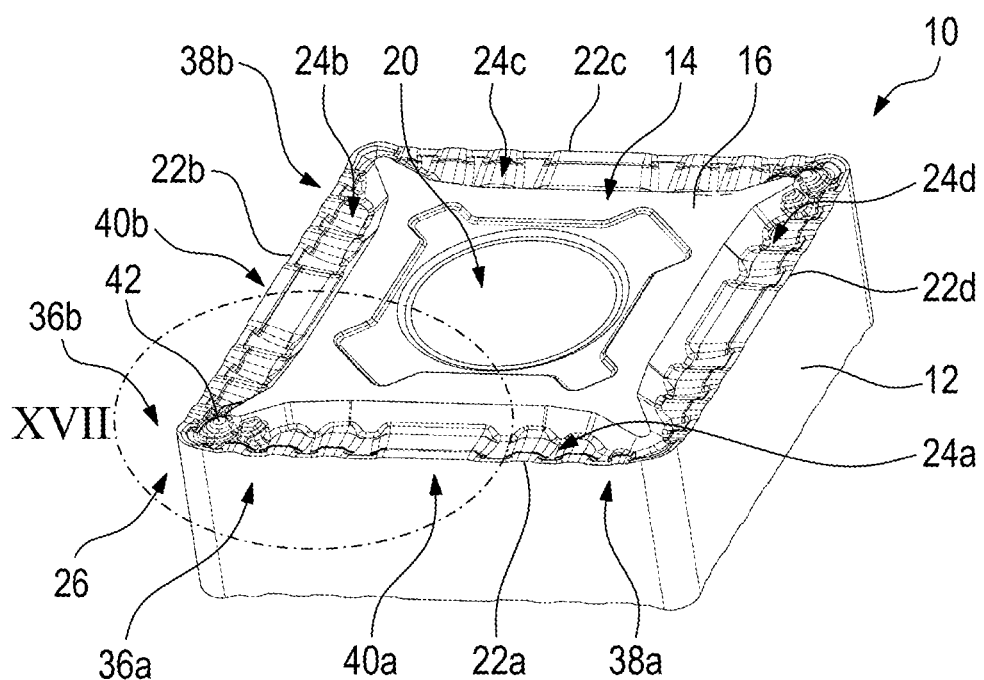
FIG. 16 shows a cutting insert according to a third embodiment of the invention in a perspective view.
Figure 17:
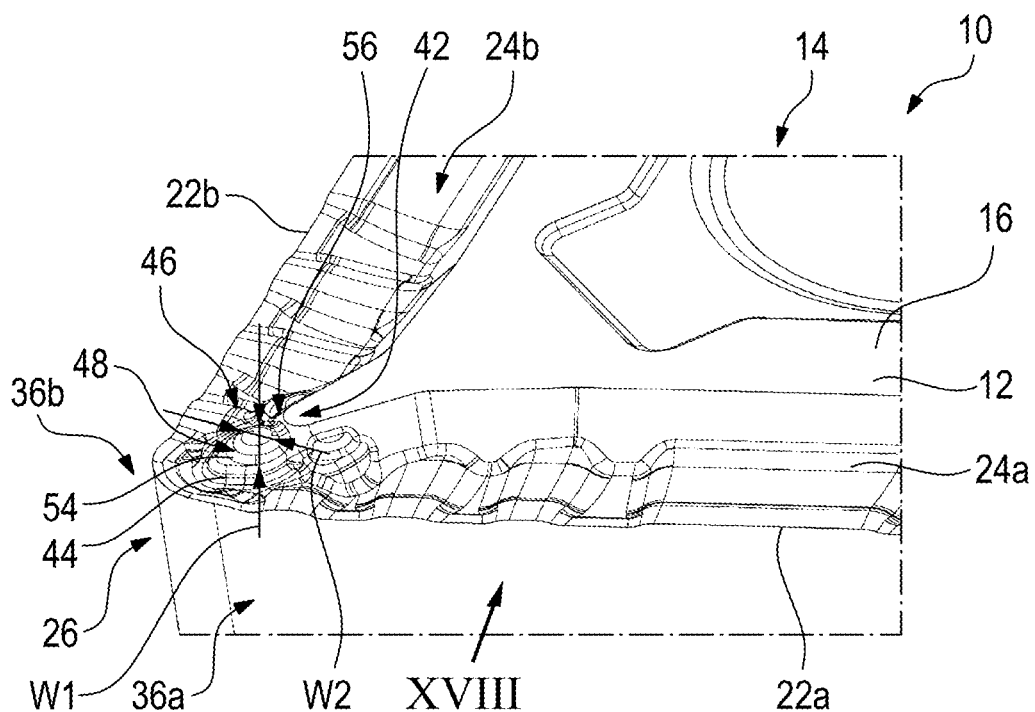
FIG. 17 shows a detail XVII of the cutting insert of FIG. 16.
Figure 18:
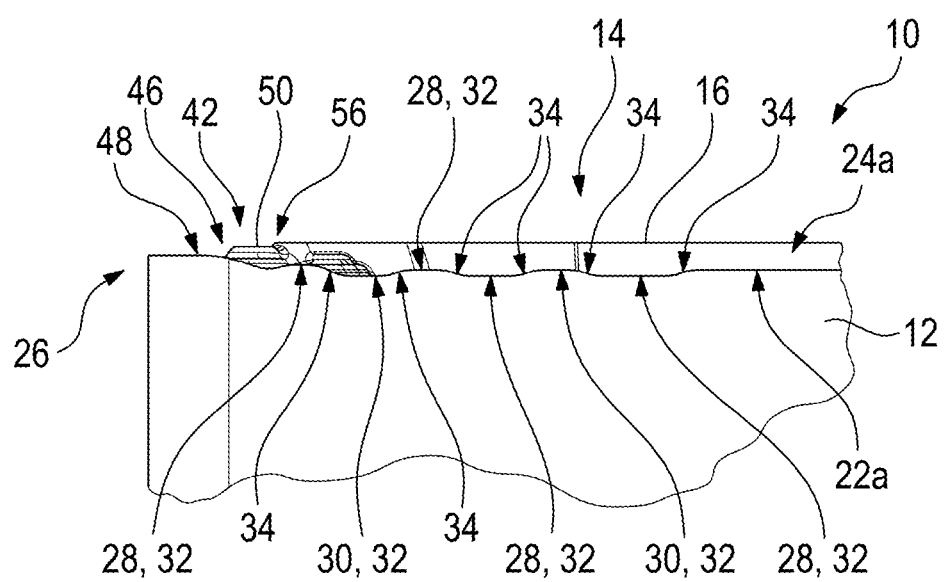
FIG. 18 shows the detail of FIG. 17 in a corresponding side view along direction XVIII in FIG. 17.

A cutting insert 10 according to a third embodiment is shown in FIGS. 16 to 18. In the following, only the differences with respect to the cutting insert 10 according to the first embodiment will be explained. Same or corresponding elements thereof will be designated with the same reference signs.

The differences again relate to the chip breaker element 42.

In the third embodiment, the chip breaker element 42 is separated from the central mounting section 14 by a gap 56, i.e. the chip breaker element 42 no longer merges with the central mounting section 14.

Moreover, the chip breaker element 42 as such is formed in accordance with the chip breaker element 42 of the second embodiment.

Thus, the top surface 50 thereof is flat and substantially parallel to the top surface 16 of the central mounting section 14.

Additionally, the step 48 comprises a substantially flat surface 54 being arranged in parallel to the top surface 16 of the central mounting section 14.

In the third embodiment only two out of four corners of the cutting insert 10 are equipped with a chip breaker element 42 as described above. This is the case for the corner 26 being formed by the cutting edges 22a and 22b and the corner being formed by the cutting edges 22c and 22d.

The corner being formed by the cutting edges 22b and 22c does not comprise a chip breaker element. Neither does the corner being formed by cutting edges 22d and 22a comprise a chip breaker element.

As far as the remaining features of the cutting insert 10 according to the third embodiment are concerned, reference is made to the explanations in respect of the first embodiment.

The invention claimed is:

1. A cutting insert comprising a cutting insert body with a central mounting section and at least one cutting edge, wherein the cutting edge is wave-shaped from an end section forming a corner portion to middle section of the cutting edge and a distance between the end section of the cutting edge and a top surface of the central mounting section is smaller than a distance between the middle section of the cutting edge and the top surface; wherein a chip guiding recess extending along the at least one cutting edge is arranged between the cutting edge and the central mounting section and a chip breaker element is arranged in the chip guiding recess, and wherein the chip breaker element comprises a first portion having a first width and a second portion having a second width, wherein a transition between the first portion and the second portion is formed as a step.

2. The cutting insert according to claim 1, wherein the cutting edge comprises a plurality of linear cutting edge segments being provided at different heights with respect to the top surface of the central mounting section.

3. The cutting insert according to claim 2, wherein neighboring linear cutting edge segments are connected by non-linear connecting segments, wherein the non-linear connecting segments tangentially merge into the neighboring linear cutting edge segments.

4. The cutting insert according to claim 1, wherein the step comprises a substantially flat surface that is arranged in parallel to the top surface of the central mounting section.

5. The cutting insert according to claim 1, wherein the chip breaker element comprises a top surface being substantially parallel to the top surface of the central mounting section.

6. The cutting insert according to claim 1, wherein the chip breaker element comprises a top surface being inclined towards the central mounting section.

7. The cutting insert according to claim 1, wherein the chip breaker element merges with the central mounting section.

8. The cutting insert according to claim 1, wherein the chip breaker element is separated from the central mounting section by a gap.

9. The cutting insert according to claim 1, wherein a rake angle ($\gamma$) varies over the length of the cutting edge.

10. The cutting insert according to claim 1, wherein a coolant channel is arranged adjacent to the chip guiding recess or within the chip guiding recess.

11. The cutting insert according to claim 1, characterized by an additional cutting edge, wherein the cutting edge and the additional cutting edge form neighboring edges of a polygon and intersect in a corner portion of the cutting insert.

12. The cutting insert according to claim 11, wherein the chip breaker element is arranged in the corner portion.

13. The cutting insert according to claim 1, wherein the cutting edge is rounded with a rounding radius (R), wherein a rounding radius (R) at a wave peak of the wave-shaped cutting edge is bigger than a rounding radius (R) at a wave base of the wave-shaped cutting edge.

14. The cutting insert according to claim 1, wherein the cutting insert is an indexable cutting insert.

15. The cutting insert according to claim 12, wherein the chip breaker element is arranged on an angle bisector of the cutting edge and the additional cutting edge.

16. The cutting insert of claim 4, wherein the surface is arranged in parallel to the top surface of the central mounting section.

* * * * *